United States Patent
Yardeni et al.

(10) Patent No.: US 7,529,181 B2
(45) Date of Patent: May 5, 2009

(54) METHOD AND APPARATUS FOR ADAPTIVE MONITORING AND MANAGEMENT OF DISTRIBUTED SYSTEMS

(75) Inventors: Eyal Yardeni, Ardsley, NY (US); Vasudeva Upadhya, New York, NY (US)

(73) Assignee: EMC Corporation, Hopkinton, MA (US)

( * ) Notice: Subject to any disclaimer, the term of this patent is extended or adjusted under 35 U.S.C. 154(b) by 856 days.

(21) Appl. No.: 11/006,472

(22) Filed: Dec. 7, 2004

(65) Prior Publication Data
US 2006/0120292 A1 Jun. 8, 2006

(51) Int. Cl.
*G01R 31/08* (2006.01)
*G06F 15/16* (2006.01)
*G06F 15/173* (2006.01)

(52) U.S. Cl. .................. 370/216; 370/236; 370/245; 709/237; 709/224

(58) Field of Classification Search .......... 370/241, 370/241.1, 242, 244, 245, 248, 251, 351, 370/400; 702/182, 183, 184, 185, 188
See application file for complete search history.

(56) References Cited

U.S. PATENT DOCUMENTS

| | | | | |
|---|---|---|---|---|
| 5,528,516 A | * | 6/1996 | Yemini et al. | 702/181 |
| 5,661,668 A | | 8/1997 | Yemini | |
| 6,249,755 B1 | * | 6/2001 | Yemini et al. | 702/183 |
| 6,963,786 B2 | * | 11/2005 | Ogushi et al. | 700/108 |
| 7,177,769 B2 | * | 2/2007 | Larsson et al. | 702/45 |

* cited by examiner

*Primary Examiner*—Hanh Nguyen
(74) *Attorney, Agent, or Firm*—Krishnendu Gupto; Joseph D'Angelo

(57) ABSTRACT

A method for providing an adaptive monitoring process for distributed system containing a plurality of detected events, each of which is associated with at least one causing event. The method comprises the steps of receiving an indication of an occurrence of at least one detected event, enabling the detection of at least one second detected event, the second detected events associated with the detected events are nominally disabled, initiating at least one process for generating at least one second causing event associated with each of the enabled second detected events and identifying selected ones of the at least one second causing events based on the occurrence of at least one corresponding one of the second detected events.

12 Claims, 9 Drawing Sheets

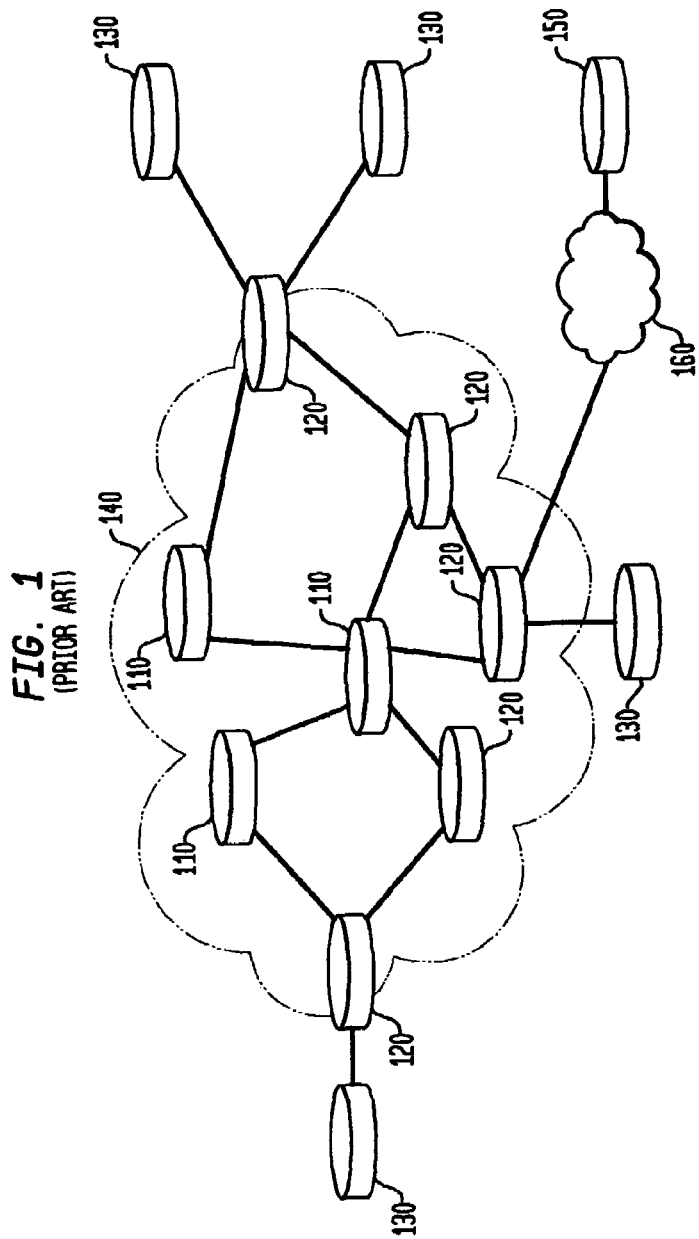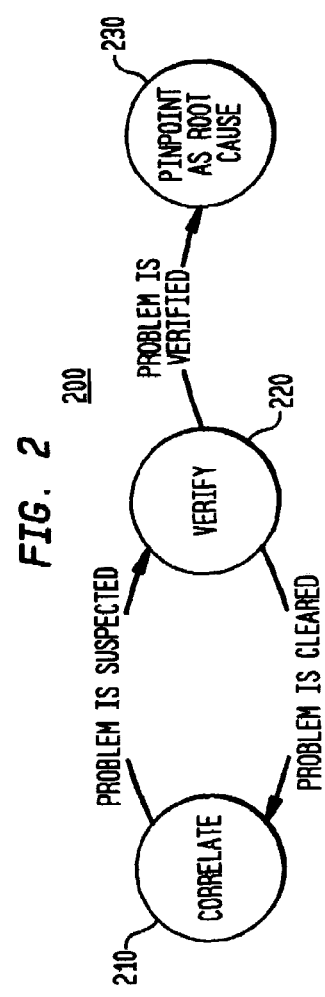

|   | $S_1$ | $S_2$ | $S_3$ | ... | $S_m$ | $S_{P1}$ | $S_{P2}$ | $S_{P3}$ | ... | $S_{Pn}$ |
|---|---|---|---|---|---|---|---|---|---|---|
| $P_1$ | 1 | 1 | 1 |  |  | 1 |  |  |  |  |
| $P_2$ | 1 | 1 |  |  | 1 |  | 1 |  |  |  |
| $P_3$ |  | 1 |  |  | 1 |  |  | 1 |  |  |
| . |  |  |  |  |  |  |  |  |  |  |
| . |  |  |  |  |  |  |  |  |  |  |
| . |  |  |  |  |  |  |  |  |  |  |
|  |  |  |  |  |  |  |  |  |  |  |
|  |  |  |  |  |  |  |  |  |  |  |
| $P_a$ | 1 |  |  |  | 1 |  |  |  |  | 1 |

|   | $S_1$ | $S_2$ | $S_3$ | ... | $S_m$ | $S_{P1}$ | $S_{P2}$ | $S_{P3}$ | ... | $S_{Pn}$ |
|---|---|---|---|---|---|---|---|---|---|---|
| $P_1$ | 1 | 1 | 1 |  |  |  |  |  |  |  |
| $P_2$ | 1 | 1 |  |  | 1 |  |  |  |  |  |
| $P_3$ |  | 1 |  |  | 1 |  |  |  |  |  |
|  |  |  |  |  |  |  |  |  |  |  |
|  |  |  |  |  |  |  |  |  |  |  |
| $P_n$ | 1 |  |  |  | 1 |  |  |  |  |  |
| $V_{P1}$ | 1 | 1 | 1 |  |  | 1 |  |  |  |  |
| $V_{P2}$ | 1 | 1 |  |  |  |  | 1 |  |  |  |
| $V_{P3}$ |  | 1 |  |  | 1 |  |  | 1 |  |  |
|  |  |  |  |  |  |  |  |  |  |  |
| $V_{Pn}$ | 1 |  |  |  | 1 |  |  |  |  | 1 |

| | $S_1$ | $S_2$ | $S_3$ | ... | $S_m$ | $S_{P1}$ | $S_{P2}$ | $S_{P3}$ | ... | $S_{Pn}$ | $S^*_{P1}$ | $S^*_{P2}$ | $S^*_{P3}$ | ... | $S^*_{Pn}$ |
|---|---|---|---|---|---|---|---|---|---|---|---|---|---|---|---|
| $P_1$ | 1 | 1 | 1 | | | | | | | | | | | | |
| $P_2$ | 1 | 1 | | | | | | | | | | | | | |
| $P_3$ | | 1 | | | | | | | | | | | | | |
| ... | | | | | | | | | | | | | | | |
| $P_n$ | 1 | | | | 1 | | | | | | | | | | |
| $V_{P1}$ | 1 | | 1 | | 1 | 1 | | | | | | | | | |
| $V_{P2}$ | 1 | | | | 1 | | 1 | | | | | | | | |
| $V_{P3}$ | | | | | 1 | | | 1 | | | | | | | |
| ... | | | | | | | | | | | | | | | |
| $V_{Pn}$ | | | | | 1 | | | | | 1 | | | | | |
| $V^*_{P1}$ | 1 | 1 | 1 | | | | | | | | 1 | | | | |
| $V^*_{P2}$ | 1 | 1 | 1 | | | | | | | | | 1 | | | |
| $V^*_{P3}$ | | | | | | | | | | | | | 1 | | |
| ... | | | | | | | | | | | | | | | |
| $V^*_{Pn}$ | | | | | | | | | | | | | | | 1 |

FIG. 3d

|  | $S_1$ | $S_2$ | $S_3$ | ... | $S_m$ | $S^1_{P1}$ | $S^2_{P1}$ | $S^3_{P1}$ | $S^1_{P2}$ | $S^1_{P2}$ | ... | $S^1_{Pn}$ | $S^2_{Pn}$ |
|---|---|---|---|---|---|---|---|---|---|---|---|---|---|
| $P_1$ | 1 | 1 |  |  |  |  |  |  |  |  |  |  |  |
| $P_2$ | 1 | 1 |  |  |  |  |  |  |  |  |  |  |  |
| $P_3$ |  | 1 |  |  |  |  |  |  |  |  |  |  |  |
| ... |  |  |  |  |  |  |  |  |  |  |  |  |  |
| $P_n$ | 1 |  |  |  | 1 |  |  |  |  |  |  |  |  |
| $v^1_{P1}$ | 1 | 1 | 1 |  |  | 1 |  |  |  |  |  |  |  |
| $v^2_{P1}$ |  |  |  |  |  |  | 1 |  |  |  |  |  |  |
| $v^3_{P1}$ | 1 |  |  |  |  |  |  | 1 |  |  |  |  |  |
| $v^1_{P2}$ |  | 1 |  |  |  |  |  |  | 1 |  |  |  |  |
| $v^2_{P2}$ |  |  | 1 |  |  |  |  |  |  | 1 |  |  |  |
| $v^2_{Pm}$ |  |  |  |  | 1 |  |  |  |  |  |  |  |  |
| ... |  |  |  |  |  |  |  |  |  |  |  |  |  |
| $v^1_{Pn}$ |  |  |  |  |  |  |  |  |  |  |  | 1 |  |
| $v^2_{Pn}$ | 1 |  |  |  | 1 |  |  |  |  |  |  |  | 1 |

|   | $S_1$ | $S_2$ | $S_3$ | ... | $S_m$ | $S_{P1}$ | $S_{P2}$ | $S_{P3}$ | ... | $S_{Pn}$ |
|---|---|---|---|---|---|---|---|---|---|---|
| $P_1$ | 1 | 1 | 1 | | | | | | | |
| $P_2$ | 1 | 1 | | | | | | | | |
| $P_3$ | | 1 | | | 1 | | | | | |
| | | | | | | | | | | |
| | | | | | | | | | | |
| $P_n$ | 1 | | | | 1 | | | | | |
| $V_{P1}$ | 1 | 1 | 1 | | | 1 | | | | |
| $V_{P2}$ | 1 | 1 | | | 1 | | 1 | | | |
| $V_{P3}$ | | 1 | | | 1 | | | 1 | | |
| | | | | | | | | | | |
| $V_{Pn}$ | 1 | | | | 1 | | | | | 1 |

<u>340</u>

|   | $S_1$ | $S_2$ | $S_3$ | ... | $S_x$ |
|---|---|---|---|---|---|
| $Pe_1$ | 1 | 1 | 1 | | |
| $Pe_2$ | 1 | 1 | | | |
| $Pe_3$ | | 1 | | | 1 |
| | | | | | |
| | | | | | |
| $Pe_m$ | 1 | | | | 1 |

<u>350</u>

|   | $S_1$ | $S_2$ | $S_3$ | ... | $S_y$ |
|---|---|---|---|---|---|
| $Pf_1$ | 1 | 1 | 1 | | |
| $Pf_2$ | 1 | 1 | | | |
| $Pf_3$ | | 1 | | | 1 |
| | | | | | |
| | | | | | |
| $P_z$ | 1 | | | | 1 |

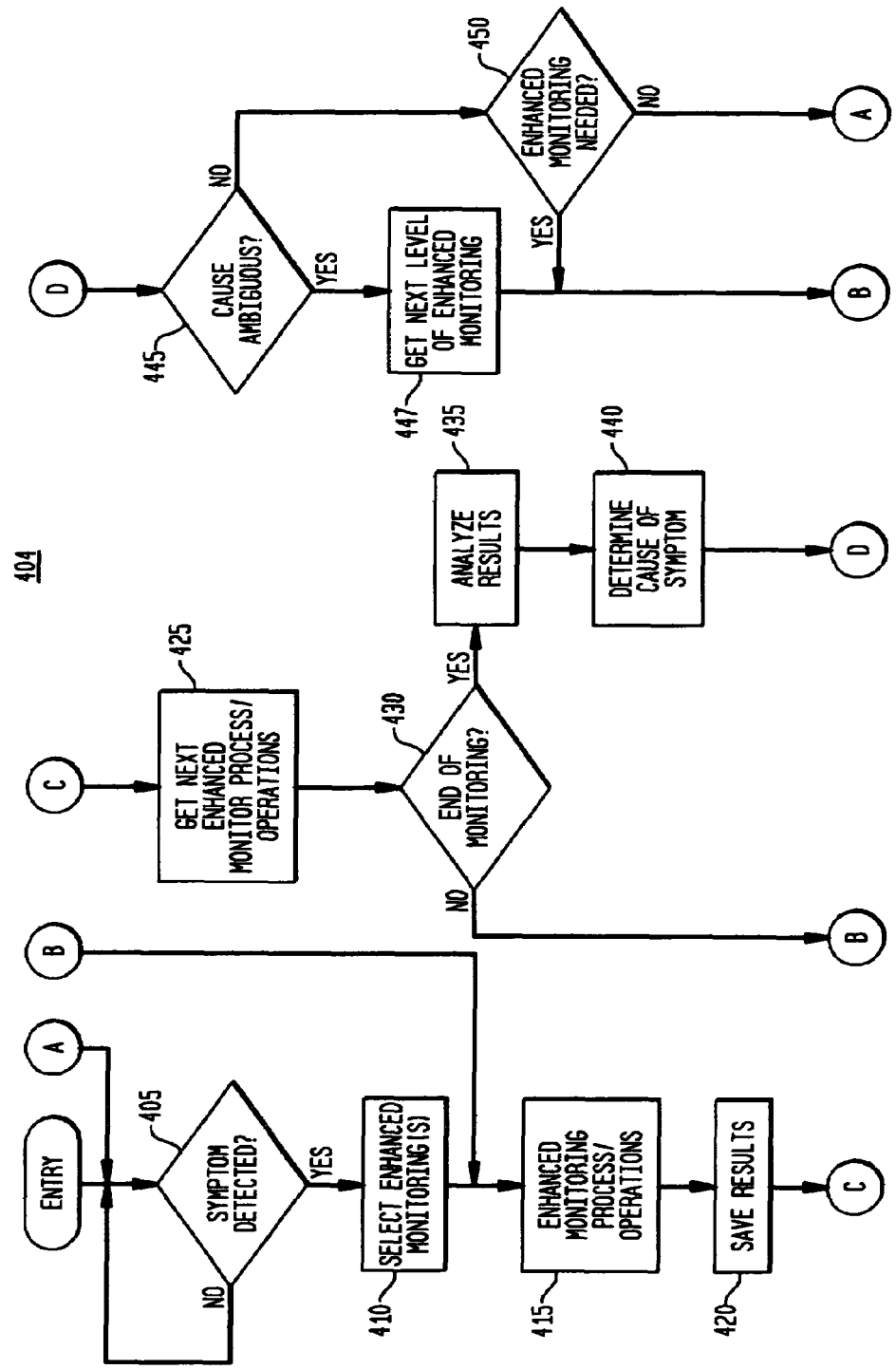

METHOD AND APPARATUS FOR ADAPTIVE MONITORING AND MANAGEMENT OF DISTRIBUTED SYSTEMS

FIELD OF THE INVENTION

This invention relates to the field on system management and more particularly to adaptive monitoring and management of distributed systems.

BACKGROUND OF THE INVENTION

As distributed systems, such as computer networks, applications, business processes, etc., continue to increase in the number of elements or components contained therein or as they transition to, or include, wireless connections, their management functions and operations have become increasingly more difficult and time consuming. FIG. 1 illustrates a conventional distributed system 100 containing a plurality of components, such as routers 110, servers 120, computers 130, etc., which are in communication over network 140. Also shown are computers 150 having access to network 140 via a wireless communication link 160.

One method for monitoring conventional networks employs polling each network component for operations such as status, performance, operation, etc. Continuous knowledge of the network operation is important, for example, to track and ensure that network performance is consistent and correct. However, such polling requires the expenditure of network resources as polling requests and acknowledgements are continuously transmitted around the network. As system size increases, the burden to provide continuous knowledge regarding component operations also increases. Thus, the increased burden imposed upon the system to determine its performance, contributes to the system not operating at its full potential.

Hence, there is need in the industry for a method and apparatus for efficient monitoring of network operation without imposing significant burden or requiring significant expenditure of network resources.

SUMMARY OF THE INVENTION

A method and apparatus for adaptively adjusting monitoring operations within a network is disclosed. The method performs a minimum level of monitoring and selectively increases the level of monitoring in selected areas, as a level of network performance, as determined by network monitoring indicate adverse performance in the selected areas to verify the cause of the adverse performance.

BRIEF DESCRIPTION OF THE FIGURES

FIG. 1 illustrates an exemplary distributed system;

FIG. 2 illustrates an exemplary state diagram of processing in accordance with the principles of the invention;

FIGS. 3a-3e illustrate exemplary aspects for providing adaptive monitoring in accordance with the principles of the invention;

FIGS. 4a-4c illustrate flow charts of exemplary processes for adaptive monitoring in accordance with the principles of the invention.

Figure 4A:
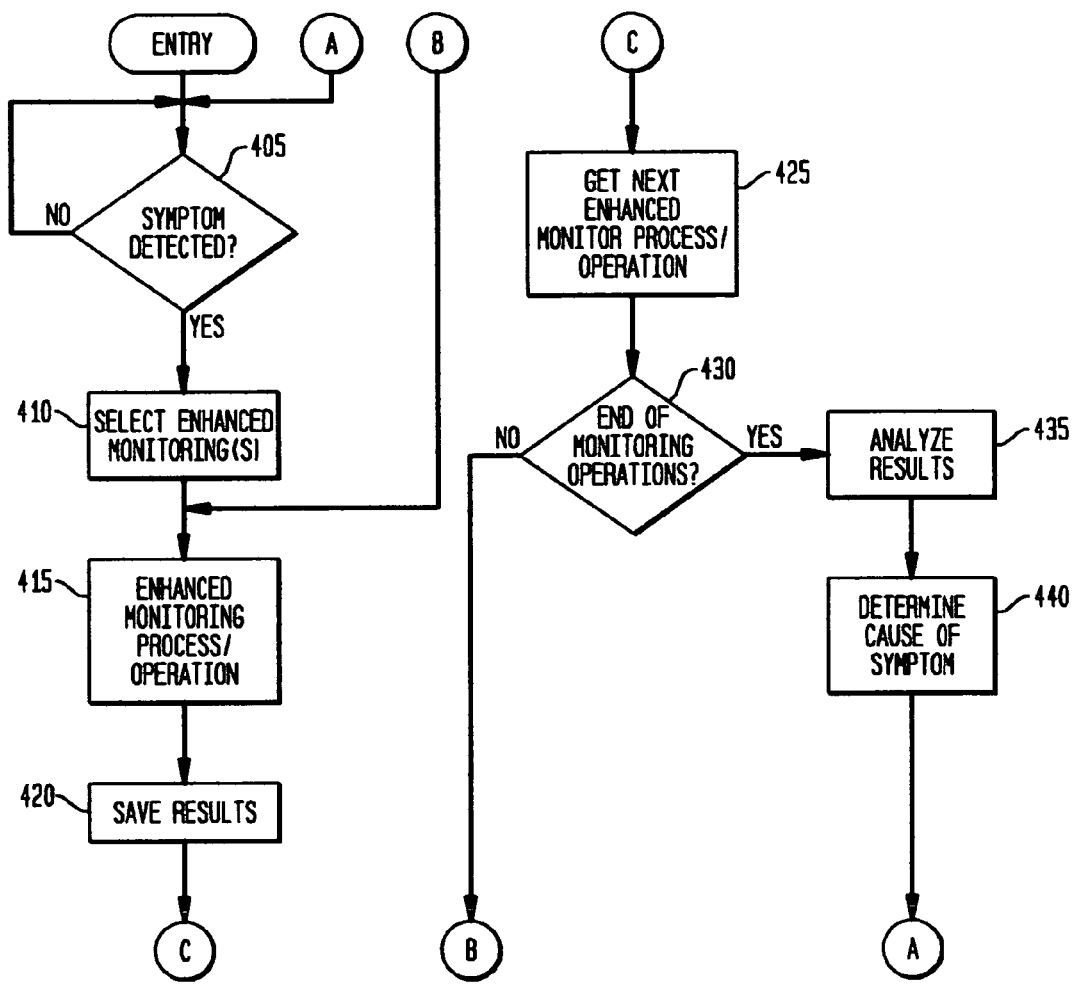

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 2 illustrates an exemplary data flow diagram 200 of processing in accordance with the principles of the invention. In this exemplary data flow, monitoring information is received at Correlate function 210, and is processed to determine the state or performance of the network operation. When a problem symptom is suspected or detected, processing continues to Verify function 220, which invokes further monitoring and/or analysis operations in selected areas. The further or enhanced monitoring may be used to verify or determine the cause of the suspected or detected problem 230. Further shown is that Verify function 220 returns operation to Correlate function 210 when a problem is cleared. Correlate function 210 returns the level of monitoring to an initial level.

FIG. 3a illustrates a first exemplary aspect for providing adaptive monitoring in accordance with the principles of the invention. In this illustrative aspect of the invention, "causing events," referred to herein as problems, $P_k$, k=1 to n, are associated with corresponding "detected events," referred to herein as symptoms, $S_j$, j=1 to m as shown by the two-dimensional representation 200. For example, when problem $P_2$ occurs, conventional distributed system monitoring operations may detect one or more symptoms $S_1$, $S_2$ and $S_m$. Correlation of causing events with detected events is well-known in the art. For example, event correlation is discussed in commonly-owned U.S. Pat. Nos. 5,528,516, 5,661,668 and 6,249,755, the contents of which are incorporated by reference herein. Although the relationship between $P_k$ and $S_j$ is shown as being definitive, it would be recognized, from the teachings of the referred-to commonly-owned US patents, that such relationships may be, in fact, probabilistic. In this case, a finite probability, typically, less than 1.0, exists that a symptom may be detected even if an associated problem occurs. Thus, to avoid confusion that may result from a discussion of probabilistic occurrence of symptoms, FIGS. 3a-3e illustrate examples in which the probability of detection is 1.0.

Also shown are second detected events, i.e., enhanced monitoring or verification symptoms $S_{P1}, S_{P2} \ldots S_{Pn}$, which are associated with problems $P_1, P_2, \ldots P_n$, respectively. Symptoms $S_{P1}, S_{P2} \ldots S_{Pn}$ are those symptoms detected as a result of enhanced monitoring or verification operations, which are invoked in response to the detection of symptoms $S_1, S_2 \ldots S_m$. The verification symptoms are nominally not enabled and only enabled when a corresponding symptom has been detected. For example, when symptom $S_2$ is detected and, as noted previously regarding the probabilistic relationship between problem and symptom, no other symptoms are detected, then the cause of the symptom $S_2$ is ambiguous among suspected problems $P_1, P_2$ or $P_3$. In this case, enhanced monitoring or verification operation may be enabled to invoke additional operations or processes, e.g., polling, trap processing, etc., specific to the verification symptoms, to determine the additional cause of the symptom $S_2$. In this case, the additional monitoring or verification operations are such that one or more of monitoring or verification symptoms $S_{P1}, S_{P2}$ and $S_{P3}$ may occur. When a single one of symptoms $S_{P1}, S_{P2}$ or $S_{P3}$ is detected, then the problem, i.e., causing event, that caused symptom $S_2$ to be detected may be determined and/or verified.

In one aspect of the invention, the specific additional operations invoked may be determined by a correlation function, similar to that disclosed in the previously referred to U.S. Pat. Nos. 5,528,516, 5,661,668 and 6,249,755. In another aspect of the invention, specific additional operations or processes invoked may be determined based on the symptom or symptoms detected.

As would be recognized, the enhanced monitoring operations may occur at the same or at a different rate than those operations that are enabled to detect symptoms $S_j$, j=1 to n. The enhanced monitoring operation may further continue for the duration of the detection of symptom $S_j$ or the enhanced monitoring symptom $S_{Pk}$. In one aspect, enhanced monitoring operation may occur for a known period.

FIG. 3b illustrates as second exemplary aspect for providing adaptive monitoring in accordance with the principles of the invention as represented by two-dimensional table 310. In this exemplary embodiment, problems and symptoms are associated as described in FIG. 3a. In addition, second causing or verification problems, $V_{Pk}$, k=1 to n, are associated with problems $P_k$ and verification symptoms $S_{Pk}$. In this illustrated case, when a symptom, $S_2$ for example, is detected, then monitoring operations, e.g., polling, are increased in areas associated with problems $V_{P1}$, $V_{P2}$ and $V_{P3}$ to determine verify whether problem $P_1$, $P_2$ or $P_3$ is the cause of symptom $S_2$. In this case, the presence of verification problem $V_{P1}$ causing symptom $S_2$ to be detected may be determined by the detection of symptom $S_{P1}$. Similarly, an indication of $V_{P2}$ causing symptom $S_2$ may be determined by the detection of symptom $S_{P2}$.

In one aspect of the invention, enhanced monitoring may continue for the duration of the detection of symptom $S_j$ and/or verification symptom $S_{Pk}$.

FIG. 3c illustrates a third exemplary aspect of the invention, which is an extension of the aspect shown in FIG. 2b. In this aspect, a second level of enhanced monitoring or verification may be invoked based on a prior level of monitoring as represented by FIG. 3b. For example, additional monitoring operations may be initialed to detect symptoms $S^*_{Pk}$, k=1 to n, to verify the cause of the problem associated with the detection of symptoms $S_{P1}$ and $S_{P2}$.

FIG. 3d illustrates a fourth exemplary aspect of the invention. In this illustrated aspect, as represented by two-dimensional table 330, problems may be deconstructed into component verification problems, wherein each component verification problem contributes to preferably, but not limited to, one symptom associated with the problem. More specifically, problem $P_1$ may be deconstructed into component verification problems $V^1_{P1}$, $V^2_{P1}$ and $V^3_{P1}$. Problems $V^1_{P1}$, $V^2_{P1}$ and $V^3_{P1}$, as shown, are associated with symptoms $S^1_{P1}$, $S^2_{P1}$ and $S^3_{P1}$, respectively. Accordingly, when symptom $S_2$ is detected, for example, enhanced monitoring or verification operations may be initiated to detect symptoms $S^1_{P1}$, $S^2_{P1}$, $S^3_{P1}$, $S^1_{P2}$, $S^2_{P2}$, and $S^1_{P3}$ (not shown). It would be appreciated that some operations may already be in progress and are sufficient to detect one or more of symptoms $S^1_{P1}$, $S^2_{P1}$, $S^3_{P1}$, $S^1_{P2}$, $S^2_{P2}$, and $S^1_{P3}$.

In one aspect, monitoring operations or processes associated selected symptoms $S_{pk}$ or $S''_{pk}$ may be deactivated for those symptoms not detected and remain activated for those symptoms that are detected. In this manner, the expenditure of system resources is limited to those operations needed.

FIG. 3e illustrates a fourth exemplary aspect of the invention. In this illustrative aspect of the invention, the detection of one or more symptoms, with regard to table 310, may initiate operations or processes that initiate operations or processes that are located in devices that are located external to the device that detected the occurrence of the one or more symptoms. For example, FIG. 3e illustrates that the occurrence of symptom $S_2$, in table 310, initiates a process or operation that invokes processes for monitoring symptoms in another device as represented by table 340. Table 340 operates in a manner similar to that described with regard to FIG. 3a and need not be described in detail. Also shown is that the occurrence of symptom, $S_{p1}$ invokes processes associated with monitoring symptoms as represented by table 350. Table 350 may initiate processes on the same or a different device or on devices that are remotely located from the device that contains table 310. The results of these initiated monitoring processes may then be provided to the initiating device for subsequent processing.

FIG. 4a illustrates a flow chart of a first exemplary process 400 in accordance with the principles. In this exemplary process, a determination is made at block 405 whether any symptoms are detected. If no symptoms are detected, then processing continues to monitor for symptoms that may be generated in the network However, if symptoms are detected at block 405, then at block 410 an enhanced level of monitoring is determined. In one aspect of the invention, the enhanced level of monitoring may consist of performing one or more operations related to the detected symptom. In another aspect of the invention, the operations may be determined based on the problems or problems correlated to the symptoms. These operations, for example, may request (e.g., poll, enable trap or interrupt processes, etc.) information of specific network components, equipment or connections, applications, or may instruct components or equipments to perform designated operations, etc. In addition, these operations may enable deactivated operations which are not normally active.

At block 415, enhanced monitoring processing is executed for each of the determined operations. At block 420, the results of specific monitoring operations or events are recorded. At block 425, a next enhanced monitor operation is obtained. At block 430, it will be determined if all the monitoring operations have completed. If the answer is in the negative, then the enhanced monitoring process associated with the next monitor operation is performed at block 415.

If, however, the answer is in the affirmative, then the results of the enhanced monitor operations are analyzed at block 435 and the determination of the cause or a verification of the cause of the symptom is made at block 440. Enhanced processing is then terminated and the processing returns to block 405.

Figure 4B:
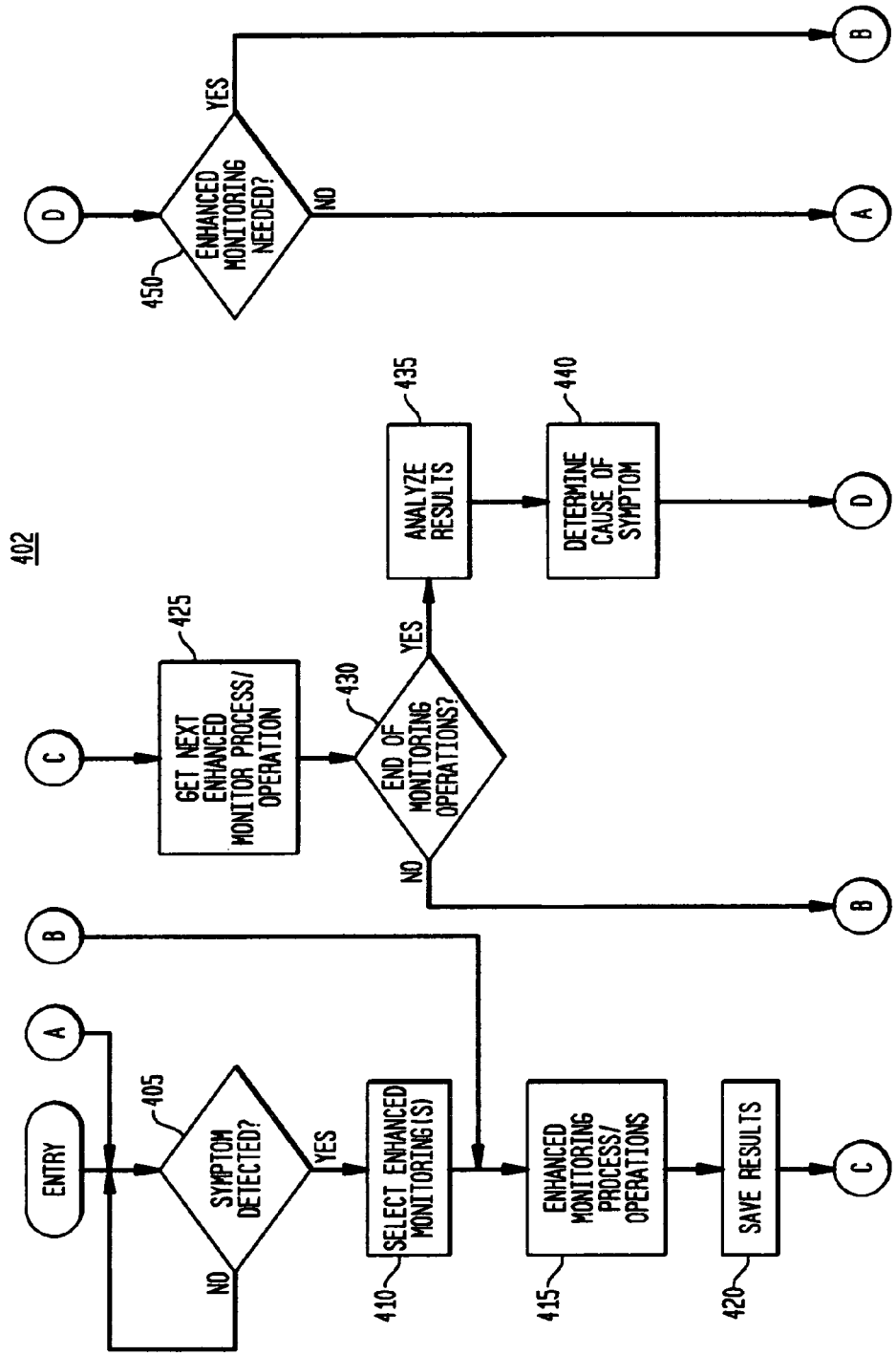

FIG. 4b illustrates a flow chart of a second exemplary process 402 in accordance with the principles. In this illustrative process, which is an extension of the processing shown in FIG. 4a, processing proceeds to block 450 after a determination is made at block 440. At block 450, a determination is made whether enhanced processing is to be continued. If the answer is in the negative, then processing proceeds to block 405. However, if the answer is in the affirmative, then processing proceeds to block 415 to continue the enhanced monitoring processes.

In one aspect of the invention, enhanced monitoring may be continued until no symptoms are detected. In another aspect, enhanced monitoring may be continued for a fixed period of time FIG. 4c illustrates a flow chart of a third exemplary process 404 in accordance with the principles and represents an extension of the processing shown in FIGS. 3a and 3b. In this illustrative process, processing proceeds to block 445 after a determination is made at block 440 (FIG. 4b). At block 445 a determination is made whether the cause of the symptom, i.e., causing event, is ambiguous. If the answer is in the affirmative, then a next level of enhanced monitoring may be obtained at block 447. This next level of enhanced monitoring may be based on the results of the enhanced monitoring already performed, similar to that shown in FIG. 3c. Processing proceeds to block 415 to execute the processing associated with the selected enhanced monitoring.

However, if the answer is in the negative, then process proceeds to block 450, where a determination is made whether enhanced processing is to be continued. As previously discussed, if the answer is in the negative, processing proceeds to block 405. However, if the answer is in the affirmative, then processing continues the enhanced monitoring process at block 415.

Figure 5:
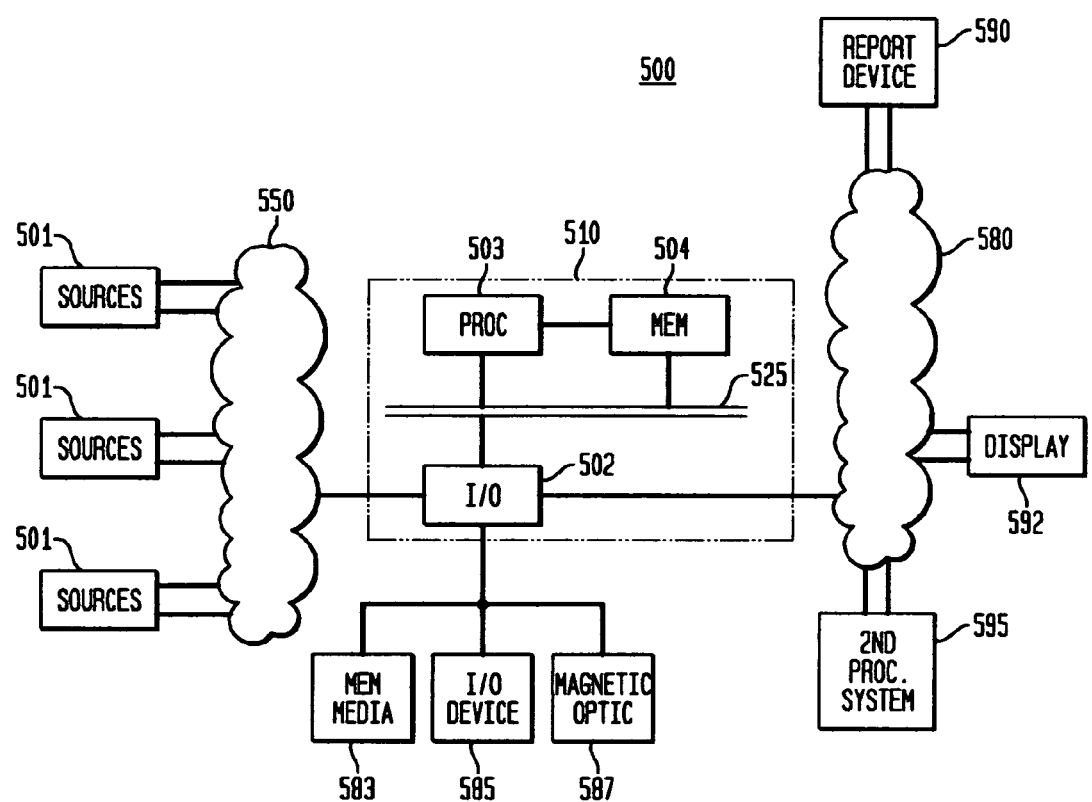
FIG. 5 illustrates an apparatus for implementing the processes discussed herein.

FIG. 5 illustrates an exemplary embodiment of a system or apparatus 500 that may be used for implementing the principles of the present invention. System 500 includes processing unit 510 that may contain one or more input/output devices 502, processors 503 and memories 504. I/O devices 502 may access or receive information from one or more sources or devices 501. Sources or devices 501 may be devices such as routers, servers, computers, notebook computer, PDAs, cells phones or other devices suitable for transmitting and/or receiving information responsive to the processes shown herein. Devices 501 may have access over one or more network connections 550 via, for example, internal bus connections, a wireless wide area network, a wireless metropolitan area network, a wireless local area network, a terrestrial broadcast system (Radio, TV), a satellite network, a cell phone or a wireless telephone network, or similar wired public networks, such as POTS, Internet, LAN, WAN and/or private networks, e.g., intranets, as well as portions or combinations of these and other types of networks. Network 550 may similarly represent a communication bus, such as PCI, USB, Firewire, etc., that allows communication between device 501 and I/O device 502.

Input/output devices 502, processors 503 and memories 504 may communicate over a communication medium 525. Communication medium 525 may represent, for example, a bus, a communication network, one or more internal connections of a circuit, circuit card or other apparatus, as well as portions and combinations of these and other communication media. Input data from devices 501 is processed in accordance with one or more programs that may be stored in memories 504 and executed by processors 503. Memory 504 may be selected, preferably, from semiconductor memories such as a Read-Only Memory (ROM), a Programmable ROM, a Random Access Memory, which is accessible through medium 525 or may be a cache memory in direct communication with processors 503. Memories 504 may also be optical or magnetic memories.

Processors 503 may be any means, such as general purpose or special purpose computing system, such as a server, laptop computer, desktop computer, a server, handheld computer, or may be a hardware configuration, such as dedicated logic circuit, or integrated circuit. Processors 503 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 504. The code may be read/downloaded from a memory medium 583, an I/O device 585 or magnetic or optical media, such as a floppy disk, a CD-ROM or a DVD, 587. The downloaded computer readable code may be stored in memory 504 or executed directly by processor 503. Although, only a single computing system is shown in FIG. 5, it would be appreciated that the code described herein may be downloaded on a single computer and selected portions then distributed over the network to other selective computer systems. In this aspect of the invention, operations, such as represented in FIG. 3e, may be executed at a location remote to a computer system detecting symptoms and managing tasks to verify and/or isolate the problem causing the symptom(s).

Information from device 501 received by I/O device 502, after processing in accordance with one or more software programs operable to perform the functions illustrated herein, may also be transmitted over network 580 to one or more output devices represented as display 592, reporting device 590, e.g., printer, or second processing system 595. Network 580 may physically be the same as network 550 or may be a different network that operates on the same or different communication principles as that of network 550.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, while a identity matrix for $V_{Pk}$ is shown, the concept shown herein is not limited to only this one embodiment. Rather, the relationship between $V_{Pk}$ and $S_{Pn}$ may be similar to the relationship of $P_k$ to $S_j$, i.e., one event causing multiple detection events. Furthermore, it would be recognized by those skilled in the art, the terms router, server and computing system are used interchangeably, herein, as their operations are distinguished only by the particular hardware software used. Generally, the routers, servers and computing systems referred-to herein may be representative of Unitary Computer Systems as represented by the Distributed Management Task Force (DMTF). The (DMTF) is the industry organization leading the development of management standards and integration technology for enterprise and Internet environments. In addition, while the present invention has been described with regard to distributed network system, composed of hardware elements, it would be recognized that the processing described herein is not limited to such systems. Rather the processing is also relevant and applicable, and considered within the scope of the invention, to distributed software systems, e.g., applications, or distributed business processes, web-browsers/web-servers, wherein software elements are distributed over a plurality of network elements. Hence, the terms "problems" and "symptoms" referred-herein are not limited to the conditions of the network hardware elements but also related to the software elements, which are operating on the network hardware, or as a standalone product.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A computer-readable media containing code thereon, said code suitable for providing an adaptive monitoring process for a distributed system, said system including a plurality of detected events, each of which is associated with at least one causing event, by providing instructions to a computing system for executing the steps of:

receiving an indication of an occurrence of at least one detected event:

responding to the at least one detected event by enabling the detection of at least one second detected event;

initiating at least one process for generating at least one second causing event associated with each of said at least one enabled second detected event;

identifying selected ones of the at least one second causing event based on the occurrence of at least one corresponding one of said at least one second detected event; and distributing selected portions of said code among selected components of said distributed system.

2. The computer-readable medium as recited in claim 1, wherein each of said at least one second causing event is associated with at least one causing event.

3. The computer-readable medium as recited in claim 1, wherein the initiated process initiates a second process.

4. The computer-readable medium as recited in claim 1, wherein the initiated second process is performed at a remote location.

5. The computer-readable medium as recited in claim 1, wherein the initiated at least one process is determined based on the occurrence of at least one detected event.

6. The computer-readable medium as recited in claim 1, wherein the initiated at least one process is determined based on at least one causing event associated with the at least one detected event occurring.

7. The computer-readable medium as recited in claim 1, the code further providing instructions to the computing system for executing the step of:

disabling the detection of selected ones of said at least one second detected event.

8. The computer-readable medium as recited in claim 7, wherein the step of disabling occurs after a predetermined time period.

9. The computer-readable medium as recited in claim 7, wherein the step of disabling occurs when the indication of the occurrence of the at least one first detected event is no longer present.

10. The computer-readable medium as recited in claim 7, wherein the step of disabling occurs when an indication of the occurrence of the at least one second detected event is no longer present.

11. The computer-readable medium as recited in claim 7, wherein the step of disabling occurs for each of the at least one second detected event which were not detected.

12. The computer-readable medium as recited in claim 1, wherein the initiated process is a request for status information.

* * * * *